Feb. 20, 1962   B. L. COUBERLY   3,021,661
NUT AND FRUIT HARVESTING BRUSH
Filed May 27, 1960
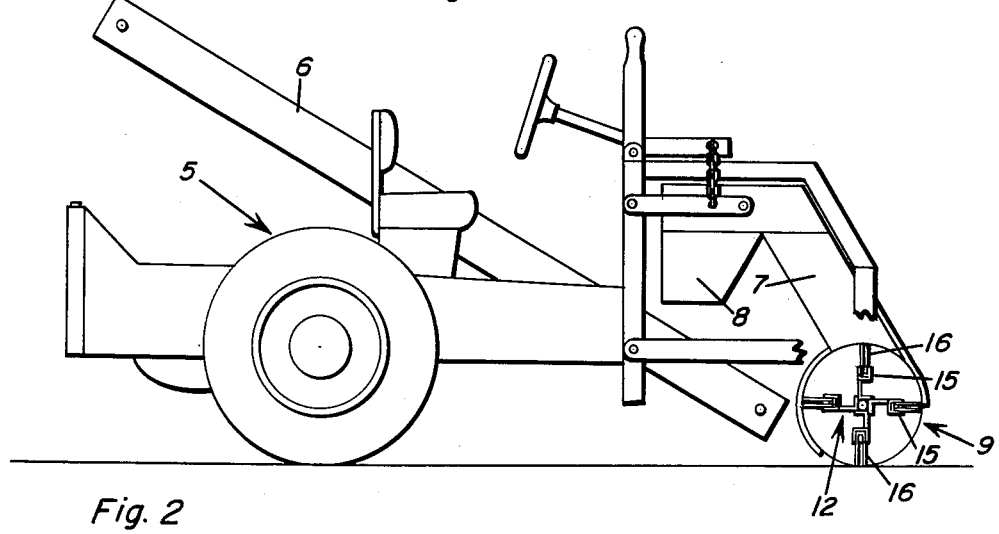
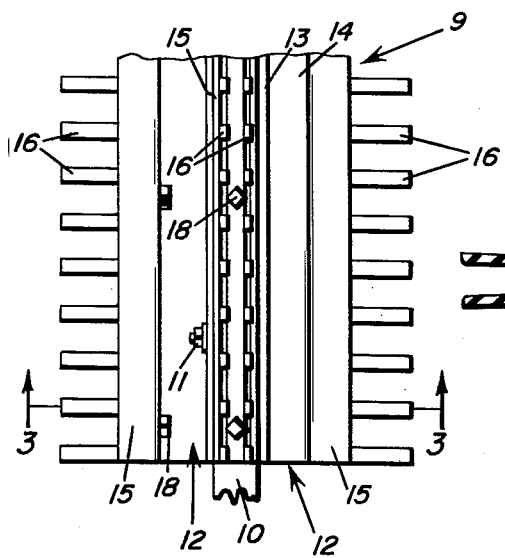
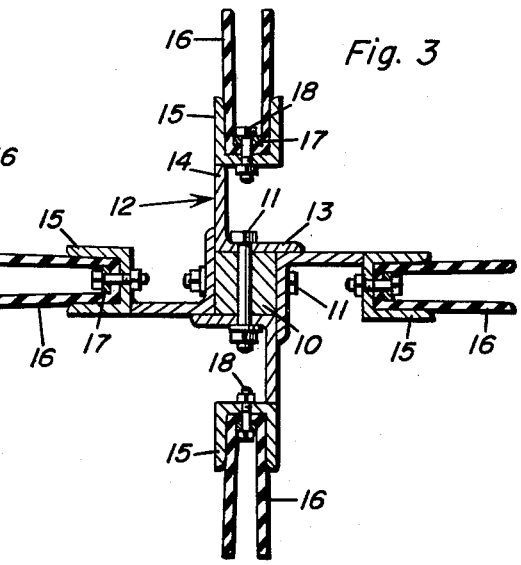
Benjamin L. Couberly
INVENTOR.
BY Clarence A. O'Brien
and Harvey B. Jacobson
Attorneys 3,021,661
NUT AND FRUIT HARVESTING BRUSH
Benjamin L. Couberly, Rte. 1, Box 66, Biggs, Calif.
Filed May 27, 1960, Ser. No. 32,331
6 Claims. (Cl. 56—364)

This invention relates generally to new and useful improvements in harvesting machines particularly, although not necessarily, for gathering or collecting nuts, fruit, etc., which are lying on the ground and has for its primary object to provide, in a manner as hereinafter set forth, a machine of this character comprising a rotary brush of a novel construction whereby the nuts or fruit, particularly the latter, may be rapidly harvested without being damaged.

Another very important object of the present invention is to provide a rotary nut and fruit harvesting brush comprising a multiplicity of resilient fingers, tines or teeth which, although durable and long-wearing, may be expeditiously removed for replacement when necessary.

Other objects of the invention are to provide a rotary brush of the character described which will be comparatively simple in construction, highly efficient and reliable in use, of light weight and which may be manufactured at low cost.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

FIGURE 1 is a view in side elevation of a harvesting machine equipped with a brush embodying the present invention, a portion of the machine being broken away to reveal said brush;

FIGURE 2 is a plan view of one end portion of the brush; and

FIGURE 3 is a view in transverse section on an enlarged scale, taken substantially on the line 3—3 of FIGURE 2.

Referring now to the drawing in detail, it will be seen that reference character 5 designates generally a power-driven harvesting machine comprising a screen elevating conveyor 6. Mounted on the front end portion of the harvester 6 is an upwardly and rearwardly inclined chute or conduit 7 comprising a downturned upper end portion 8 for depositing the nuts, fruit, etc., on the conveyor 6.

The embodiment of the present invention which has been illustrated comprises a rotary brush which is designated generally by the reference character 9. As best seen in FIGURE 1 of the drawing, the brush 9 is mounted to rotate in the lower end portion of the chute 7 for throwing the crop being gathered upwardly and rearwardly therein.

The brush 9 includes a square shaft 10 the end portions of which are journaled in suitable bearings (not shown) provided therefor on the machine 5. Secured longitudinally by bolts 11 on the sides or faces of the square shaft 10 are angle bars 12 of suitable metal. As shown to advantage in FIGURE 3 of the drawing, the base flanges 13 of the angle bars 12 project beyond the shaft 10 and abut the flanges 14 of said angle bars in a manner to support or reinforce each other and to strengthen the assembly in general.

Fixed as by welding on the free longitudinal edges of the flanges 14 of the angle bars 12 are channel members 15 of suitable metal. Mounted at suitably spaced points in the channel members 15 are generally U-shaped fingers, tines or teeth 16 of rubber or other suitable resilient material. Bars 17 removably secure the fingers 16 in the channel members 15. The bight portions of the channel members 15 are apertured to accommodate bolts 18 which secure the bars 17 in position.

It is thought that the operation of the invention will be readily apparent from a consideration of the foregoing. Briefly, the brush 9 may be driven from any suitable source of power. As viewed in FIGURE 1 of the drawing, the brush 9 rotates counterclockwise. As the machine moves forwardly nuts, fruit, etc., lying on the ground in the path thereof are thrown upwardly through the chute 7 in an obvious manner and deposited on the elevating conveyor 6. The resilient fingers 16 effectively contact the crop and sweep it upwardly without damage into the chute 7.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A rotary harvesting brush comprising a square shaft, angle bars mounted longitudinally on the faces of said shaft, said angle bars including base flanges secured to the shaft and free flanges, the free longitudinal marginal portions of said base flanges projecting beyond the shaft in face-abutting engagement with the adjacent free flanges, channel members fixed longitudinally on the free longitudinal edges of said free flanges in spaced, opposed relation to the base flanges, and resilient fingers mounted in said channel members.

2. A rotary harvesting brush comprising a square shaft, angle bars mounted longitudinally on the faces of said shaft, said angle bars including base flanges secured to the shaft and free flanges, the free longitudinal marginal portions of said base flanges projecting beyond the shaft in face-abutting engagement with the adjacent free flanges, channel members fixed longitudinally on the free longitudinal edges of said free flanges in spaced, opposed relation to the base flanges, and resilient fingers mounted in said channel members, said fingers being generally U-shaped and having their bight portions anchored in the channel members.

3. A rotary harvesting brush comprising a square shaft, longitudinal angle bars on the shaft, including base flanges engaged with the faces thereof, and free flanges, bolts detachably securing the base flanges to the shaft, channel members fixed longitudinally on the free longitudinal edges of the free flanges and overlying the respective base flanges in spaced, opposed relation thereto, generally U-shaped resilient fingers mounted in the channel members, and means for removably securing said fingers in said channel members.

4. A rotary harvesting brush comprising a square shaft, longitudinal angle bars on the shaft, including base flanges engaged with the faces thereof, and free flanges, bolts detachably securing the base flanges to the shaft, channel members fixed longitudinally on the free longitudinal edges of the free flanges and overlying the respective base flanges in spaced, opposed relation thereto, generally U-shaped resilient fingers mounted in the channel members, and means for removably securing said fingers in said channel members, said base flanges having their free longitudinal marginal portion projecting beyond the shaft in face-abutting engagement with the adjacent free flanges.

5. A rotary harvesting brush comprising a square shaft, longitudinal angle bars on the shaft, including base flanges engaged with the faces thereof, and free flanges, bolts detachably securing the base flanges to the shaft, channel members fixed longitudinally on the free longitudinal edges of the free flanges and overlying the respective base flanges in spaced, opposed relation thereto, generally U-shaped resilient fingers mounted in the channel members, and means for removably securing said fingers in said channel members, said means including flat bars mounted longitudinally in the channel members and engaged transversely in the bight portions of the fingers, and bolts securing said flat bars to the bight portions of said channel members.

6. A rotary harvesting brush comprising a square shaft, longitudinal angle bars on the shaft, including base flanges engaged with the faces thereof, and free flanges, bolts detachably securing the base flanges to the shaft, channel members fixed longitudinaly on the free longitudinal edges of the free flanges and overlying the respective base flanges in spaced, opposed relation thereto, generally U-shaped resilient fingers mounted in the channel members, and means for removably securing said fingers in said channel members, said base flanges having their free longitudinal marginal portions projecting beyond the shaft in face-abutting engagement with the adjacent free flanges, said means including flat bars mounted longitudinally in the channel members and engaged transversely in the bight portions of the fingers, and bolts securing said flat bars to the bight portions of said channel members.

References Cited in the file of this patent

UNITED STATES PATENTS

| | | |
|---|---|---|
| 2,441,244 | Kimball | May 11, 1948 |
| 2,449,042 | Abbrecht | Sept. 14, 1948 |
| 2,654,201 | Hyman | Oct. 6, 1953 |
| 2,657,515 | Rust | Nov. 3, 1953 |
| 2,854,808 | Ramacher et al. | Oct. 7, 1958 |